United States Patent [19]

Silverman

[11] Patent Number: 5,550,905
[45] Date of Patent: Aug. 27, 1996

[54] METHOD AND APPARATUS FOR DELIVERING CALLS AND CALLER IDENTIFICATION INFORMATION TO MULTI-LINE USERS

[75] Inventor: David P. Silverman, Somerville, N.J.

[73] Assignee: Lucent Technologies Inc., Murray Hill, N.J.

[21] Appl. No.: 329,739

[22] Filed: Oct. 26, 1994

[51] Int. Cl.$^6$ .......................... H04M 1/56; H04M 15/06; H04M 11/00; H04M 1/00
[52] U.S. Cl. .............................. 379/142; 379/157; 379/93
[58] Field of Search .............................. 379/93, 111, 112, 379/113, 114, 201, 210, 212, 265, 266, 142, 128, 156, 157; 370/58.1, 60, 68.1, 110.1

[56] References Cited

U.S. PATENT DOCUMENTS

| | | |
|---|---|---|
| Re. 31,789 | 1/1985 | Hashimoto . |
| 4,227,649 | 10/1980 | Poffenroth . |
| 4,512,013 | 4/1985 | Nash et al. . |
| 4,546,212 | 10/1985 | Crowder, Sr. . |
| 4,680,785 | 7/1987 | Akiyama et al. . |
| 4,873,719 | 10/1989 | Reese . |
| 4,899,358 | 2/1990 | Blakley . |
| 5,008,930 | 4/1991 | Gawrys et al. ...................... 379/212 X |
| 5,163,087 | 11/1992 | Kaplan . |
| 5,170,426 | 12/1992 | D'Alessio et al. . |
| 5,265,145 | 11/1993 | Lim . |
| 5,283,824 | 2/1994 | Shaw . |
| 5,335,628 | 8/1994 | Kelly, Jr. et al. ................... 379/113 X |
| 5,428,608 | 7/1995 | Freeman et al. ......................... 370/60.1 |

OTHER PUBLICATIONS

Stallings, "Data and Computer Communications," 2nd Ed., MacMillan Publishing, 1988, Chap. 18, pp. 583–614.

*Primary Examiner*—Stephen Chin
*Assistant Examiner*—Paul Loomis

[57] ABSTRACT

Telephone calls and corresponding caller identification information are delivered to a multi-line user having a plurality of agent terminals by a plurality of communications lines with one of the communications lines being a common voice-data communications line. All telephone calls and corresponding caller identification information are routed over respective voice and data channels in the common voice-data communications line, if such line is not busy with a previous caller to the multi-line user. If such line is busy, then the caller identification information is routed over the data channel of the common voice-data communications line while the call is routed over one of the other communications lines.

31 Claims, 3 Drawing Sheets

METHOD AND APPARATUS FOR DELIVERING CALLS AND CALLER IDENTIFICATION INFORMATION TO MULTI-LINE USERS

FIELD OF THE INVENTION

This invention relates generally to improvements in telecommunication systems and services, and more particularly to the delivering of caller identification information to multiline users over switched telecommunication lines.

BACKGROUND OF THE INVENTION

In-bound telemarketing refers generally to the transaction of business by telephone, and typically involves a multi-line user, capable of simultaneously handling a number of incoming calls. Exemplary in-bound telemarketing applications include airline, hotel and rental car reservation systems, credit card, banking and other financial service systems, and catalog ordering systems. The incoming calls are made by customers to, for example, a toll free 800 number of the multi-line user, and are routed to the multi-line user's facility by an interexchange carrier network ("IXC") and local exchange carrier networks ("LEC"). Within the multi-line user facility, the in-bound calls are typically routed to one of a number of available agent terminals by a private branch exchange ("PBX").

Caller identification information, such as a caller's automatic number identifier ("ANI"), regarding each in-bound call can be made available to the multi-line user by the IXC. The caller identification information enables the multi-line user to perform call screening, automatic call direction and other features, usually associated with conventional PBXs. Although typical PBX's are capable of processing caller identification information, not all PBX's have a necessary data link with the IXC to receive such information. Further, conventional "caller ID" services available for local telephone calls are not provided for long distance calls including those through an IXC.

Caller identification information is provided to those multi-line users whose PBXs communicate with the associated LEC over a T1 line. One channel of the 24 available channels of the T1 line is commonly dedicated to providing the caller identification information to the PBX. T1 lines are able to handle a large number of in-bound calls, but are very costly to install and operate. As a consequence, a large number of multi-line users do not have the volume of in-bound telephone calls to justify the expense of using a T1 carrier.

A multi-line user's PBX may alternatively communicate with the LEC or IXC over Plain Old Telephone System ("POTS") lines. However, conventional POTS lines cannot simultaneously provide both caller identification information and voice communications. As a consequence, an additional communications line exclusively dedicated to providing only caller identification information for each in-bound telephone call may be installed between the multi-line user's PBX and the IXC. However, there is a substantial expense to the multi-line user for the installation and monthly line charges for maintaining this additional communications line.

Nevertheless, although maintaining an additional line is less costly than a T1 line, the installation and maintenance charges may be still too expensive for a large number of multiline users. Therefore, a large number of multi-line users carry on their business and operate their PBX without receiving the available caller identification information.

As is apparent from the above, a need exits for an efficient method and apparatus to provide caller identification information to multi-line users.

SUMMARY OF THE INVENTION

In accordance with the present invention, a method is disclosed wherein telephone calls and corresponding caller identification information are delivered to a multi-line user having a plurality of agent terminals by a plurality of communications lines with one of the communications lines being a common voice-data communications line. All telephone calls and corresponding caller identification information are routed over respective voice and data channels in the common voice-data communications line, if such line is not busy with a previous caller to the multi-line user. If such line is busy, then the caller identification information is routed over the data channel of the common voice-data communications line while the call is routed over one of the other communications lines.

In accordance with another aspect of the present invention, an apparatus includes a telephone network switch connected to the multi-line user facility by at least one voice communications line; a processor connected to the switch; and a high capacity node connected to the switch and the processor. The high capacity node is also connected to the multi-line user facility by a common voice-data communications line.

In operation, the processor controls the switch and high capacity node to deliver the telephone call and its caller identification information to the multi-line user facility via the common voice-data communications line if not busy with communications between a previous caller and a multi-line user agent terminal. If such line is busy, the processor controls the switch and high capacity node to deliver the telephone call by an available voice communication line between the switch and the multi-line user facility, and the corresponding caller identification information by the high capacity node and the data channel of the common voice-data communications line. The telephone conversation over the voice communications channel of the common voice-data communications line may continue without any awareness that the corresponding data channel is being used to transmit information concerning a different in-bound call to the multi-line user facility.

In accordance with another aspect of the present invention. The processor delays any termination of a communications link, consisting of the voice communications and data channels, on the common voice-data communications line corresponding to a previous caller and a multiple user agent terminal until completion of the transmission of the caller identification information corresponding to the in-bound call. In this manner, the processor prevents the termination of a communications link during the transmission of information on the corresponding dam channel.

The present invention provides the caller identification information of all in-bound calls over an established communications link. This technique does not require the use of costly T1 lines or additional telecommunication lines exclusively dedicated to the transmission of data to provide such information. This technique further enables a multi-line user facility, to receive the caller identification information in a manner that produces no increase in the multi-line user's line usage fees.

Additional features and advantages of the present invention, will become apparent by reference to the following detailed description and accompanying drawings.

DETAILED DESCRIPTION

Figure 1:
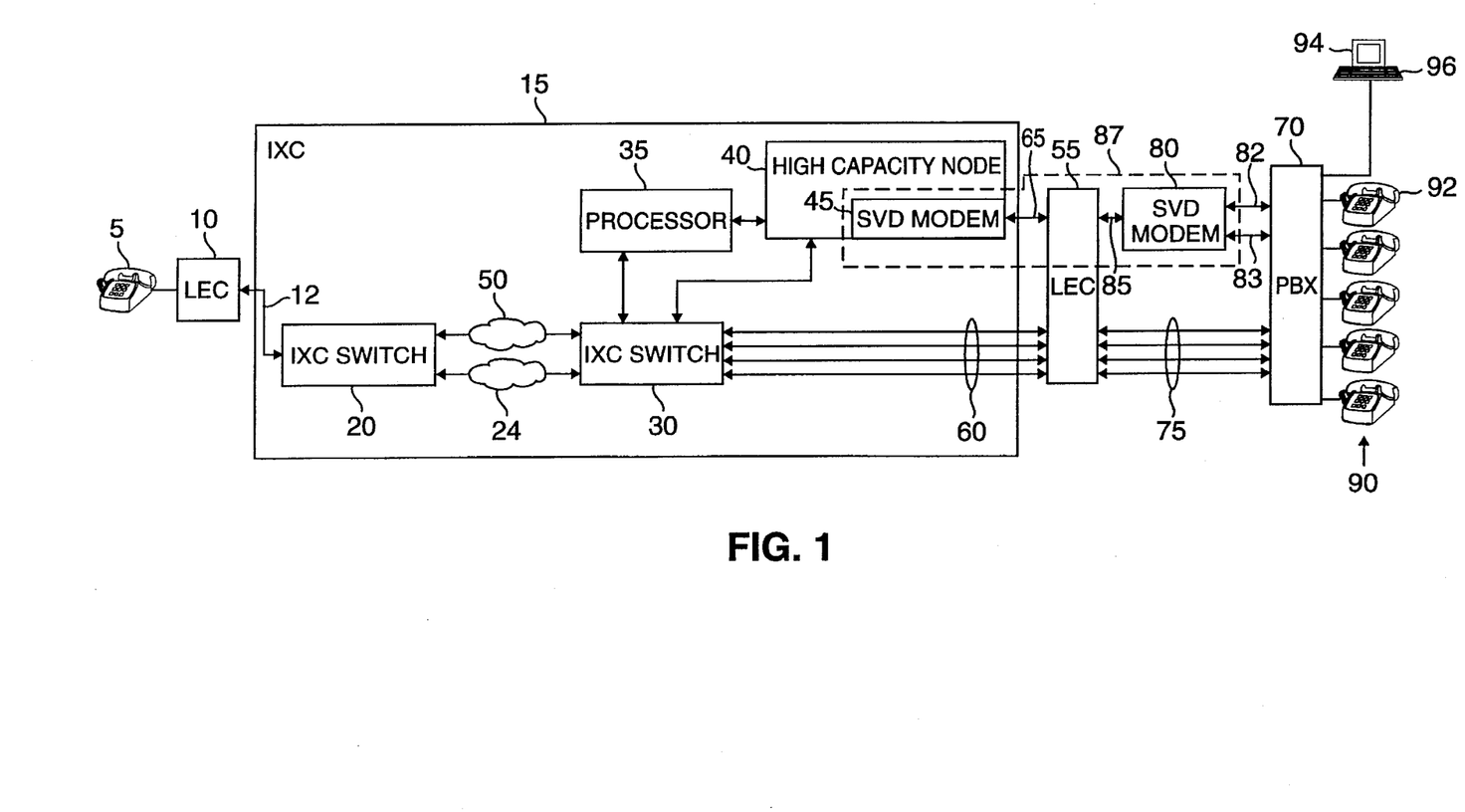
FIG. 1 is a block diagram of an exemplary telecommunication system that provides caller identification information to a multi-line user in accordance with the present invention.

FIG. 1 shows an exemplary telecommunication system that provides caller identification information to a multi-line user in accordance with the present invention. The exemplary system shown is a telephone network which also provides voice communication between a caller and a multi-line user such as, for example, an 800 number subscriber. As used herein, "a multi-line user" refers to a business or other operation using an in-bound or out-bound multi-line facility to service its customers, and may be, for example, an airline, hotel or car rental agency, or a bank or other financial institution. Also, as used herein, "a communications line" refers to one or more electrical wires or optical connections, as well as wireless communications connections.

To contact the multi-line user, the caller initiates a call from a caller terminal 5, which may be a telephone with a corresponding Plain Old Telephone Service ("POTS") number. The call initiated at terminal 5 is directed to a local exchange switch 10 within a local exchange carrier ("LEC") network. The local exchange switch 10 may be, for example, a 5ESS® Switching System, manufactured by AT&T Corp. ("AT&T").

The local exchange switch 10 routes the call to a switch network such as a long distance inter-exchange carrier ("IXC") network 15 over a communications link 12. In one embodiment of the invention, the link 12 contains all that is necessary to achieve a voice connection and a signaling or data connection between the LEC switch 10 and the IXC network 15. Caller identification information of the caller terminal 5 may be passed on the signaling connection over the link 12.

Within the IXC network 15, the call is directed to an originating IXC switch 20. Based on the number called, the IXC switch 20 will direct the call over a voice communication network 26 to a terminating IXC switch 30. Each of the IXC switches 20 and 30 may be a toll office with Common Channel Signalling ("CCS") capability, such as the 4ESS® Switching System manufactured by AT&T. The CCS provides a high-speed data link which may, for example, carry network control and signalling information over a signaling network 50 connected to IXC switches 20 and 30. The network control and signaling information may include caller identification information and switch routing instructions for corresponding telephone calls traversing the voice communication network 24.

In carrying the call over the network 24, the call may have been directed, for example, across various trunks and through various switching nodes (not shown) according to the corresponding signalling information transmitted over the signaling network 50. An exemplary type of CCS suitable for use in the present invention is CCS No. 7, also known as Signaling System 7 ("SS7").

A processor 35 is interfaced to the IXC switch 30 and controls it to direct calls destined for the multi-line user to the LEC switch 55 over one of a plurality of voice communication lines, such as POTS lines 60, or through a high capacity node 40. The corresponding caller identification information transmitted over the signaling network 50 is received by the IXC switch 30 and routed to the high capacity node 40. The caller identification information is routed to the high capacity node 40 independent of whether the corresponding call is routed through the high capacity node 40 or one of the plurality of voice communication lines 60.

The high capacity node 40 operates to route data, such as the caller identification information and voice communication, or data alone, between the IXC switch 30 and the multi-line user via the LEC switch 55. A suitable high capacity node 40 is a Conversant switch available from AT&T Corp. In order to provide simultaneous voice and data communications over a POTS line 65, the high capacity node 40 may employ a simultaneous voice-data ("SVD") modem. The SVD modem 45 is a modem that provides simultaneous voice and data service within the bandwidth provided by a single POTS channel, such as a bandwidth of approximately 3.2 KHz. A suitable SVD modem 45 is described in U.S. Pat. No. 4,512,013, assigned to the assignee of the present invention, which is hereby incorporated by reference. One exemplary, commercially available SVD modem is the AT&T Dataport® 2001 modem. Present SVD modems typically can simultaneously provide a telephone quality voice channel and a data carrying channel, referred to as the data channel, of up to 4800 bits per second.

The SVD modem 45 modulates the caller identification information onto a data channel of a communications line 65 which is connected to the LEC switch 55. Any call routed through the high capacity node 40 will be modulated on a voice channel of the communications line 65.

A call routed over one of the plurality of voice communication lines 60 to the LEC switch 55, is routed by the LEC switch 55 over a corresponding one of a second plurality of communications lines 75 to a private branch exchange ("PBX") 70 of the multi-line user. The PBX 70 routes an in-bound call to an available operator at an agent terminal, such as a telephone 92, in the hunt group of agent terminals 90. In addition, the caller identification information and/or call received by the LEC switch 55 over the communications line 65 is, likewise, routed over a communications line 85, which is capable of simultaneously providing voice and data service, to another SVD modem 80.

The SVD modem 80 demodulates the signals received over the communications line 85 to obtain the caller identification information and/or call and provides them to the PBX 70 over data line 82 and voice communication line 83, respectively. Any call received over the voice communication line 83 may be directed to an agent terminal in the hunt group 90 in a substantially identical manner to a call received from one of the plurality of lines 75.

An in-bound call and corresponding caller identification information are received substantially simultaneously by the PBX 70. Accordingly, the PBX 70 may use the received caller identification information to perform operations, such as call screening and automatic call direct, to a particular agent terminal in the hunt group 90. In addition, the caller identification information may be displayed on an optional output device such as a video monitor 94. An optional keyboard 96 may be used by an operator to direct calls to a particular agent terminal of the hunt group 90 based on the information displayed on the monitor 94.

An exemplary configuration of a common voice-data communications line is denoted by broken outline 87. The common voice-data communications line 87 comprises SVD modems 45, 80 and communication lines 65 and 85 as shown in FIG. 1. This common voice-data communications line 87 simultaneously provides voice communication and data exchange between the high capacity node 40 and the PBX 70. Any high capacity line or component group that is capable of simultaneously providing voice communication and data exchange may be used as the common voice-data communication line 87. One suitable alternative configuration of the common voice-data communication line 87 is an integrated services digital network line which is described in, for example, Stallings, *Data and Computer Communications*, Chap. 18, pp. 583–614 (2nd Ed., MacMillan Publishing, 1988), which is incorporated by reference herein. Another suitable alternative configuration of the common voice-data line employs a digital wireless data communication channel and an ordinary POTS line voice communication channel.

Within the IXC network 15, the processor 35 and high capacity node 40 supplement the functionality available with typical IXC switches. The processor 35 and high capacity node 40 operate together to provide features and services that typical IXC switches could not otherwise provide without significant redesign. In accordance with the principles of the present invention, one such service permits the IXC network 15 to deliver caller identification information relating to all in-bound calls to the PBX 70 in an efficient manner without requiring a T1 line, or a separate line exclusively dedicated for the transmission of caller identification information, or multiple common voice-data communications lines. New IXC switches may be designed to have the functionality of the processor 35 and high capacity node 40 built in.

Included in the caller identification information may be the automatic number identifier ("ANI") associated with the caller terminal 5. ANI is well known and is described in greater detail in, for example, U.S. Pat. No. 5,163,087, which is incorporated by reference herein. The caller identification information may also include the unique Calling Line Identify ("CLI") associated with the POTS caller terminal 5. The PBX 70 can identify a particular caller terminal 5 by a CLI associated with that terminal in a manner well known in the art. Further details of CLI-based call processing may be found in, for example, U.S. Pat. No. 4,227,649, which is also incorporated by reference herein. Another caller identifier includes the POTS or private telephone number of the caller terminal which the PBX 70 is capable of recognizing and processing in a well known manner. Suitable commercially available PBX's which can process caller identification information include the Merlin and AT&T Partner manufactured by AT&T Corp.

In operation, when a long distance telephone call is originated by a caller from the caller terminal 5 to the multi-line user, the telephone call and caller identification information will be passed by the LEC switch 10 to the IXC switch 20 of the IXC network 15. The IXC network 15 would route the telephone call and caller identification information from the IXC switch 15 to the IXC switch 30 over the voice communication and signaling networks 26 and 50 based on the dialed area code.

In accordance with the present invention, the processor 35 determines if a communications link between a previous caller and the agent terminal of the hunt group 90 is in progress through the high capacity node 40 and the common voice-data communications line 87 to the PBX 70. A "communications link", as used herein, refers to the establishment of a virtual circuit for voice communication between a caller terminal, such as the terminal 5, and an agent of the multi-line user. Further, the communications link may consist of respective voice communication and data channels on the common voice-data communications line 87.

If a communications link is not in progress when the IXC switch 30 receives the telephone call originating from the caller terminal 5, the processor 35 causes a communications link to be established over the common voice-data communications line 87 to the PBX 70. After the communications link is established, both the telephone call and caller identification information are substantially simultaneously passed over the respective voice communication and data channels in the common voice-data communications line 87 from the IXC switch 30 to the PBX 70.

The PBX 70 routes the received telephone call from the voice communications channel to an available agent terminal in the hunt group 90. The PBX 70 may utilize the substantially simultaneously received caller identification information to route the call to a particular agent terminal, or display this information on the monitor 94. Voice communication between the caller and the agent will be carried over the voice communication channel of the common voice-data communications line 87 in a manner well known in the art.

The caller identification information is data that is transmitted in a burst immediately after a communications link has been established and the telephone call received. After such data is transmitted, typically no more data corresponding to the telephone call is transmitted to the called multi-line user. Accordingly, if the processor 35 determines that a communications link is in progress over the common voice-data communications line 87 when an in-bound telephone call is received by the IXC switch 30, then the processor 35 causes the corresponding caller identification information of the in-bound telephone call to be transmitted to the PBX 70 through the high capacity node 40 and over the data channel of the common voice-data communications line 87. In such instance, the processor 35 further routes the corresponding call to the PBX 70 over one of the plurality of voice communication lines 60, the LEC switch 70, and the corresponding one of the plurality of communication lines 75.

The telephone conversation in progress with the previous caller over the voice communications channel of the common voice-data communications line 87 continues without any awareness that the corresponding data channel is being used for transmission of information regarding a different telephone call to the multi-line user. Thus, the present invention achieves an advantage by providing caller identification information to multi-line users without requiring the use of costly T1 carrier lines or separate lines exclusively dedicated for the transmission of data. Another advantage of the present invention is the providing of caller identification information over an established communication link which does not produce any increase in line usage fees for the transmission of caller identification information.

Figure 2A:
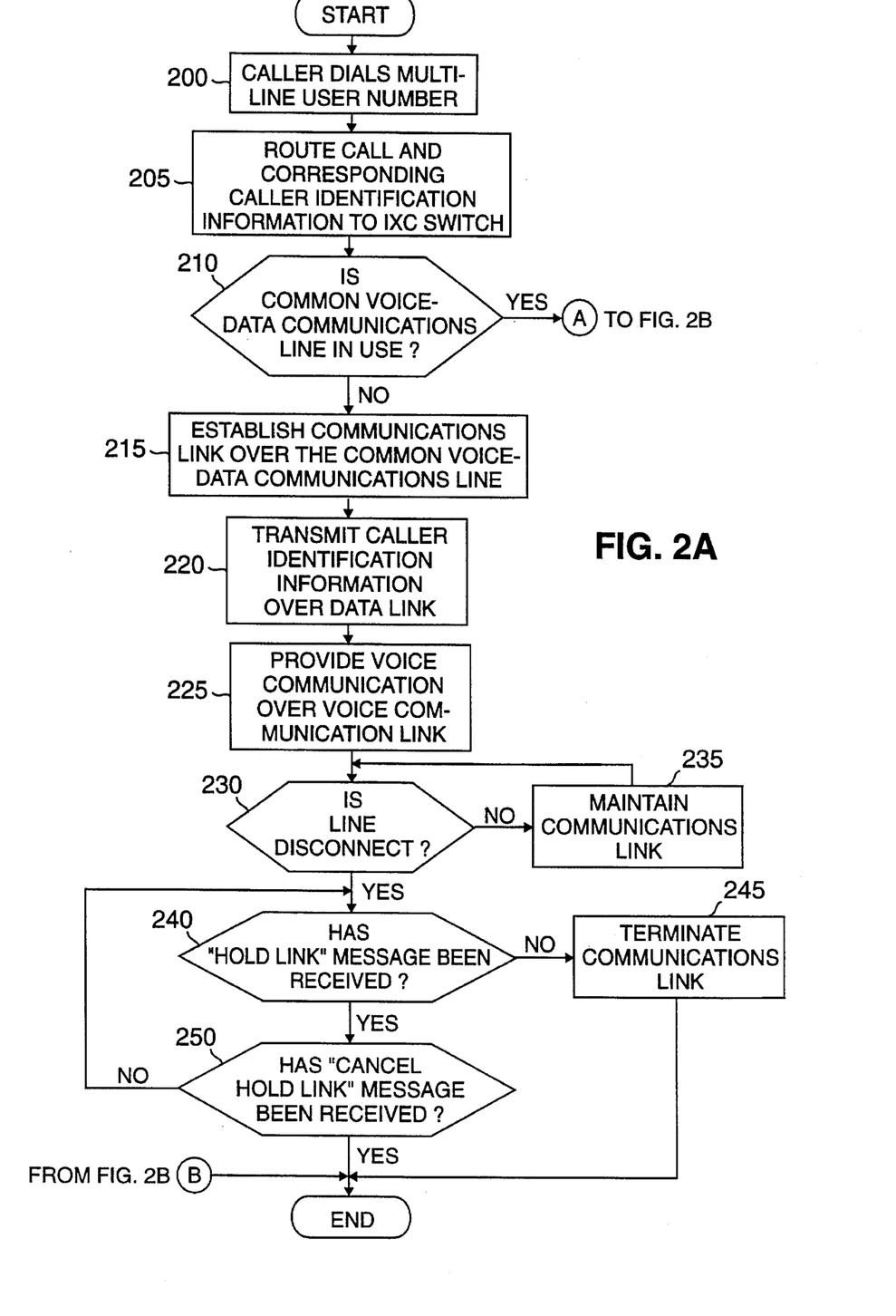
FIGS. 2A–2B are a flow diagram illustrating an exemplary method of providing caller identification information to a multi-line user in accordance with the present invention.
Figure 2B:
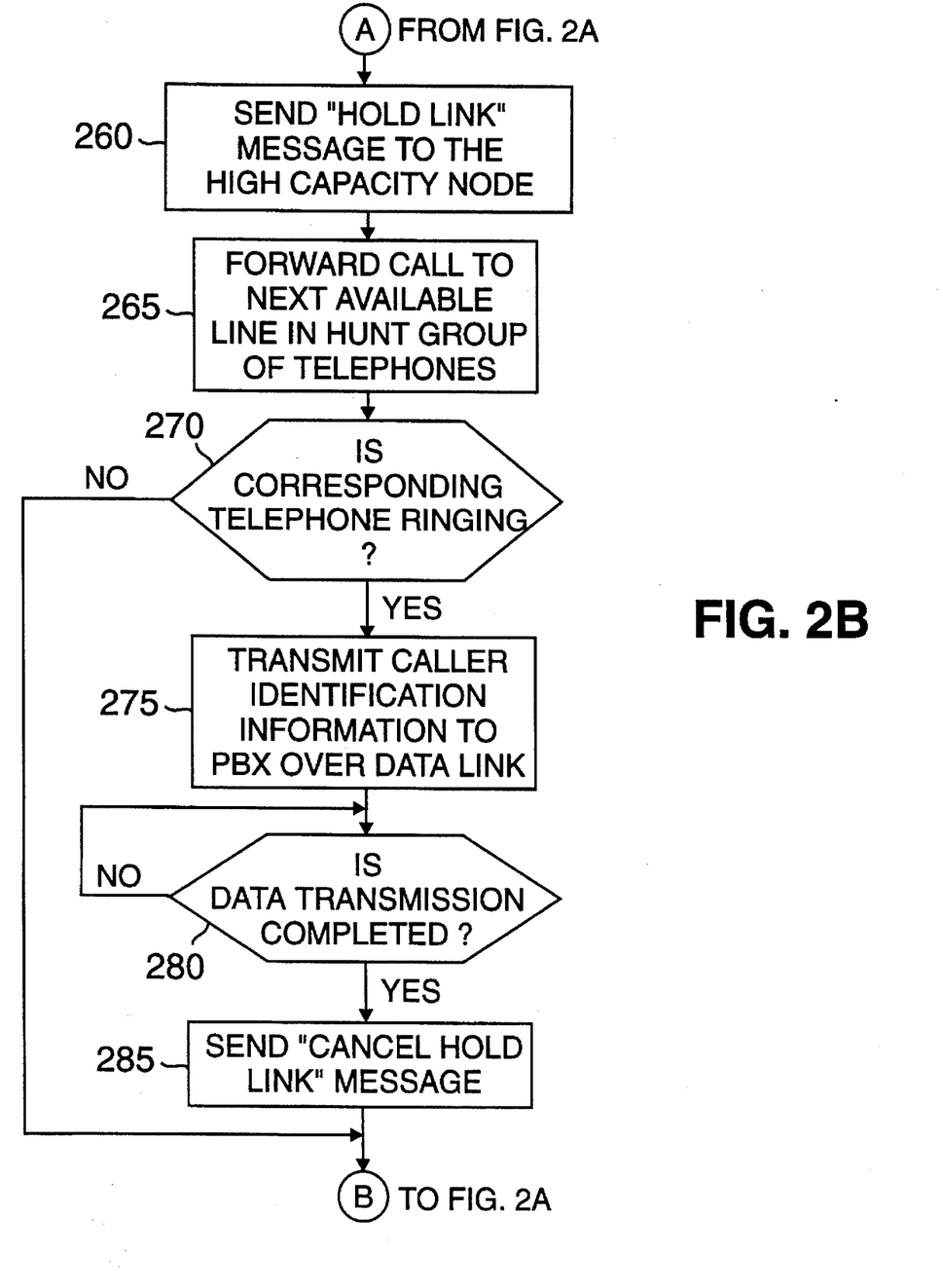

FIGS. 2A–2B show an exemplary flow diagram illustrating a call handling method in accordance with the present invention using the telecommunication system of FIG. 1. Referring to FIG. 2A, a caller places a telephone call to a multi-line user by, for example, dialing a corresponding toll-free 800 number from the caller terminal 5, as noted in step 200. The call and caller identification information are then directed from the LEC switch 10 to the IXC network 15 which routes then to the IXC switch 30 associated with the destination multi-line user, as shown in step 205.

Then, in step 210, the processor 35 determines if a communications link is in progress through the high capacity node 40 and over the common voice-data communications line 87 between a previous caller and the PBX 70 of the multi-line user. In other words, the processor determines whether the common voice-data communications line 87 is busy maintaining another call. If the line 87 is not busy, the call handling method performs steps 215–250 to establish a communications link over the voice-data communications line 87 to transmit the telephone call and caller identification information to the PBX 70. However, if the common voice-data communications line 87 is busy, then the call method performs steps 260–285 to transmit the caller identification information to the PBX 70 on an established data channel of the communications link over the common voice-data communications line 87, and establish voice communications with the multi-line user through one of the plurality of voice communications lines 60 and corresponding one of the plurality of voice communication lines 75.

Accordingly, if the processor 35 determines in step 210 that a communications link over the common voice-data communications line 87 is not in progress, then it establishes such a communications link with respective voice communication and data channels in step 215. After the communications link over the common voice-data communications line 87 has been established, the processor 35 causes the IXC switch 30 and high capacity node 40 to transmit the caller identification information to the PBX 70 over the established data channel in step 220. Then, in step 230, the telephone call is completed over the voice communications channel between an available agent terminal of the hunt group 90 of the PBX 70 and the caller terminal 5. The PBX 70 may determine the appropriate agent to receive the call based on the received caller identification information from the data link.

The processor 35 then determines whether a disconnect message is received indicating that the voice communications between the agent terminal and the caller has been terminated by, for example, either or both of them "hanging up" their respective telephones in step 230. If a disconnect message has not been received, the processor 35 continues to maintain the established communications link over the common voice-data communications line 87 in step 235. After performing step 235, the call handling method repeats step 230 again to determine if a disconnect message has been received.

When a disconnect message is received in decision step 230, the high capacity node 40 determines whether a "hold link" message has been received from the processor 35 in step 240. If a "hold link" message has not been received, then the high capacity node 40 and IXC switch 30 terminates the established communications link over the common voice-data communications line 87, in step 245, and the call handling method ends. However, if a "hold link" message is received prior to performing the decision step 240, then the high capacity node 40 maintains the communications link over the common voice-data communications line 87 and does not terminate such link until a "cancel hold link" message is received from the processor 35, as indicated by repeatedly performing step 250. The "hold link" and "cancel hold link" messages will be discussed in greater detail below with regard to steps 260–280.

If, in step 210, the processor 35 determines that a communications link is in progress over the common voice-data communications line 87 when the in-bound call from the caller terminal 5 is received by the IXC switch 30, then the call handling method proceeds to step 260 in FIG. 2B. In step 260, the processor 35 sends the "hold link" message to the high capacity node 40 to prevent it from terminating the communications link prior to the complete transmission of the caller identification information for the in-bound call over the established data channel on the common voice-data communications line 87. Then, in step 265, the IXC switch 30 forwards the in-bound call to the next available one of the plurality of communications lines 60, 75 to the PBX 70, and correspondingly, the PBX 70 routes the telephone call to the next available agent terminal in the hunt group 90. The telephone call may be routed over the respective one of the corresponding plurality of voice communication lines 60 and 75 as controlled by the IXC and LEC switches 30 and 55.

The processor 35 then determines if the agent's terminal in the hunt group 90 to which the call was routed returns a "ringing" signal in step 270. Such a "ringing" signal indicates that the agents terminal is not busy with another call. If the agent's terminal does not return a "ringing" signal, then it would typically return a "busy" signal which would indicate that all the agents terminals in the hunt group 90 are busy and no agent terminal is available to take the in-bound call. As a consequence, the call handling method ends. However, if a "ringing" signal is detected in decision step 270, then the processor 35 causes the IXC switch 30 and high capacity node 40 to transmit the caller identification information for the in-bound call to the PBX 70 over the established data channel of the common voice-data communications line 87 in step 275.

The processor 35 next determines if the caller identification information transmission is completed in step 280. The processor 35 repeatedly performs the decision step 280 until the caller identification information transmission is complete. Upon completing the information transmission, the call handling method proceeds to step 285. In step 285, the processor 35 transmits the "cancel hold link" message to the high capacity node 40 and the call handling method ends for this in-bound call. The call handling method may be performed for each in-bound call directed to the multi-line user.

By utilizing the "hold link" and "cancel hold link" messages, the call handling method prevents a termination of the communications link over the common voice-data communications line 87 before the complete transmission of the caller identification information of an in-bound call. As a consequence, if a telephone conversation over the communications link ends with a previous caller during the transmission of the caller identification information for an in-bound call, the "hold link" message will cause the communications link to be maintained. Upon completing the transmission of the caller identification information, the "cancel hold link" message is sent and the communications link is then permitted to terminate. Thus, the termination of the communications link, if necessary, is delayed until the transmission of the caller identification information is completed.

Although one embodiment of an apparatus and method for delivery of caller identification information to multi-line users has been described in detail above, it would be readily understood by those having ordinary skill in the art that many modifications are possible in the described embodiment without departing from the teaching of the present invention. All such modifications are intended to be encompassed by the claimed invention. For instance, the invention may be used for outbound calling by a multi-line user. For such a multi-line user, the PBX 70 would make sure that outbound data calls, or voice and data calls, would be sent over the common voice-data communications line 87 if it was not busy. Applications for such outbound call services include the transmission of user-to-user information, such as calling party name, remote log-in information and account information. A signalling method substantially similar to that described above for in-bound calls may be used to prevent termination of an established communications link when data is about to be sent over the dam link corresponding to an outbound call made over one of the voice communications lines.

I claim:

1. A method of delivering a telephone call from a caller and delivering corresponding caller identification information to a multi-line user facility including a plurality of agent terminals using a common voice-data communications line having a voice channel and a data channel and at least one voice communications line, said method comprising:

a) determining upon receipt of the telephone call whether a communications link is in progress between a previous caller and one of said plurality of agent terminals of said multi-line user facility over the common voice-data communications line;

b) establishing a communications link over the common voice-data communications line between the present caller and an agent terminal of the multi-line user facility if a communications link is determined not to be in progress on such line in step a);

c) routing the caller identification information of the present caller for the telephone call to the multi-line user facility over the data channel of the common voice-data communications line;

d) routing the telephone call to one of the plurality of terminals in the multi-line user facility over the voice channel of the common voice-data communications line if a communications link is determined not to be in progress on such channel in step a); and e) establishing a communications link over said voice communications line and routing the call to one of the plurality of terminals in the multi-line user facility over said voice communications line if a communications link is determined to be in progress on the common voice-data communications line in step a) while still routing the caller identification information for the telephone call to the multi-line user facility over the data channel of the common voice-data communications line.

2. The method of claim 1, wherein the caller identification information is an automatic number identifier of a caller terminal used by said caller.

3. The method of claim 1, further comprising the steps of:

modulating and demodulating caller identification information on the data channel of the common voice-data line using simultaneous voice data ("SVD") modems; and modulating and demodulating the voice communication on the voice channel of the common voice-data line using the SVD modems, wherein the common voice-data communications line is a pots line.

4. The method of claim 1, further comprising transmitting outbound data from the multi-line user facility over the data channel.

5. The method of claim 4, further comprising delaying any termination of the communications link on the common voice-data communications line until completion of an outbound data transmission.

6. A method of delivering a telephone call from a present caller and corresponding caller identification information to a multi-line user facility including a plurality of agent terminals, said method comprising:

a) determining upon receipt of the telephone call whether a communications link is in progress between a previous caller and one of said plurality of agent terminals over a first POTS line in a telephone network, wherein the communications link includes first and second channels created by a SVD modem over the first POTS line:

b) establishing a communications link over the first POTS line between the present caller and the multi-line user facility if a communications link is determined not to be in progress on such line in step a);

c) routing the caller identification information of the present caller to the multi-line user facility over the second channel within the first POTS line;

d) routing the call to one of the plurality of agent terminals in the multi-line user facility over the first channel of the first POTS line if a communications link is determined not to be in progress on such channel in step a); and e) routing the call to one of the plurality of terminals in the multi-line user facility over a second POTS line if a communications link is determined to be in progress on the first POTS line in step a) while still routing the caller identification information of the present caller to the multi-user facility over the second channel within the first POTS line.

7. The method of claim 6, further comprising delaying any termination of the communications link on the first POTS line for a previous caller and a multi-line user agent terminal until completion of the transmission of the caller identification information of the present caller if a communications link is determined to be in progress on the line in step a).

8. The method of claim 6, wherein the caller identification information is an automatic number identifier of a caller terminal used by said caller.

9. The method of claim 6, further comprising transmitting outbound data from the multi-line user facility over the data channel.

10. The method of claim 9, further comprising delaying any termination of the communications link on the common voice-data communications line until completion of an outbound data transmission.

11. An apparatus for delivering a telephone call from a caller terminal and corresponding caller identification information to a multi-line user facility including a plurality of agent terminals, said apparatus comprising:

means for determining whether a communications link is in progress between a previous caller and one of said agent terminals of said multi-line user facility over a common voice-data communications line;

means for establishing a communications link over the common voice-data communications line between the present caller and an agent terminal of the multi-line user facility if a communications link is determined not to be in progress with a previous caller by the determining means;

means for routing the caller identification information of the present caller to the multi-line user facility over a data channel of the common voice-data communications line if a communications link is determined not to be in progress with a previous caller by the determining means;

means for routing the call to one of the agent terminals of the multi-line user facility over a voice channel of the common voice-data communications line if a communications link is determined not to be in progress with a previous caller by the determining means; and means for routing the call to one of the agent terminals of the multi-line user facility over a voice communications line if a communications link is determined not to be in progress with a previous caller by the determining means while still routing the caller identification information for the present caller to the multi-line facility over the data channel of the common voice-data communications line.

12. The apparatus of claim 11; wherein the caller identification information is an automatic number identifier of a caller terminal used by said caller.

13. The apparatus of claim 11, wherein the common voice-data communications line is an integrated services digital network line.

14. The apparatus of claim 11, wherein the common voice-data communications line is a POTS line.

15. The apparatus of claim 14, further comprising first and second SVD modems connected to a first and second ends of the POTS line.

16. The apparatus of claim 11 further comprising means for transmitting outbound data from the multi-line user facility over the data channel.

17. The apparatus of claim 15 further comprising means for delaying any termination of the communications link on the common voice or data communications line until completion of an outbound data transmission.

18. An apparatus for delivering a telephone call from a caller terminal and corresponding caller identification information to a multi-line user facility including a plurality of agent terminals, said apparatus comprising:

a telephone network switch connected to the multi-line user facility by at least one voice communications line;

a processor connected to the switch; and a high capacity node connected to the switch and the processor, the high capacity node being further connected to the multi-line user facility by a common voice-data communications line, wherein the common voice-data line carries voice communications and data, and wherein the processor controls the switch and high capacity node to deliver the telephone call and its caller identification information to the multi-line user facility via the common voice-data communications line if not busy with communications between a previous caller and a multi-line user agent terminal, and to deliver the telephone call by the voice communication line between the switch and the multi-line user facility, and the corresponding caller identification information by the high capacity node and common voice-data communications line if the common voice-data communications line is busy.

19. The apparatus of claim 18, wherein the processor further controls the high capacity node to delay termination of any communications link over the common voice-data communications line corresponding to a previous caller once caller identification information for the present caller is to be transmitted and until such information transmission has completed.

20. The apparatus of claim 18, wherein the caller identification information is an automatic number identifier of a caller terminal used by said caller.

21. The apparatus of claim 18, wherein the common voice-data communications line is an integrated services digital network line.

22. The apparatus of claim 18, wherein the common voice-data communications line is a POTS line.

23. The apparatus of claim 22, further comprising first and second SVD modems connected to a first and second ends of the POTS line.

24. The apparatus of claim 18, further comprising means for transmitting outbound data from the multi-line user facility over the data channel.

25. The apparatus of claim 24, further comprising means for delaying any termination of the communications link on the common voice or data communications line until completion of an outbound data transmission.

26. A method of delivering a telephone call from a caller and delivering corresponding caller identification information to a multi-line user facility including a plurality of agent terminals using a common voice-data communications line and at least one voice communications line, said method comprising:

a) determining whether a communications link is in progress between a previous caller and one of said plurality of agent terminals of said multi-line user facility over the common voice-data communications line;

b) establishing a communications link over the common voice-data communications line between the present caller and an agent terminal of the multi-line user facility if a communications link is determined not to be in progress on such line in step a);

c) routing the caller identification information of the present caller to the multi-line user facility over a data channel on the common voice-data communications line;

d) routing the call to one of the plurality of terminals in the multi-line user facility over a voice channel of the common voice-data communications line if a communications link is determined not to be in progress on such channel in step a);

e) routing the call to one of the plurality of terminals in the multi-line user facility over said voice communications line if a communications link is determined to be in progress on the common voice-data communications line in step a); and f) delaying any termination of the communications link on the common voice-data communications line corresponding to a previous caller and a multiple user agent terminal until completion of the transmission of the caller identification information of the present caller if a communications link is determined to be in progress on the line in step a).

27. The method of claim 26, wherein the delaying step f) comprises the steps of:

sending a hold link message to a high capacity node maintaining the communications link on the common voice-data communications line after determining that a communications link is in progress on such line in step a); and sending a cancel hold link message to the high capacity node maintaining the communications link after the caller identification information of the present caller has been transmitted to the multi-line user facility over the data, wherein the high capacity node maintains the communications link independent of whether voice communication over the voice link has terminated if a hold link message is received, and wherein the high capacity node permits a disconnect to occur if a corresponding cancel link is received and the voice communication over the voice communication link has terminated.

28. A method of delivering a telephone call from a present caller and corresponding caller identification information to a multi-line user facility including a plurality of agent terminals, said method comprising:

a) determining whether a communications link is in progress between a previous caller and one of said plurality of agent terminals over a first POTS line in a telephone network, wherein the communications link includes first and second channels created by a SVD modem over the first POTS line;

b) establishing a communications link over the first POTS line between the present caller and the multi-line user facility if a communications link is determined not to be in progress on such line in step a);

c) routing the caller identification information of the present caller to the multi-line user facility over the second channel within the first POTS line;

d) routing the call to one of the plurality of agent terminals in the multi-line user facility over the first channel of the first POTS line if a communications link is determined not to be in progress on such channel in step a);

e) routing the call to one of the plurality of terminals in the multi-line user facility over a second POTS line if a communications link is determined to be in progress on the first POTS line in step a); and f) delaying any termination of the communications link on the first POTS line for a previous caller and a multi-line user agent terminal until completion of the transmission of the caller identification information of the present caller if a communications link is determined to be in progress on the line in step a).

29. An apparatus for delivering a telephone call from a caller terminal and corresponding caller identification information to a multi-line user facility including a plurality of agent terminals, said apparatus comprising:

means for determining whether a communications link is in progress between a previous caller and one of said agent terminals of said multi-line user facility over a common voice-data communications line;

means for establishing a communications link over the common voice-data communications line between the present caller and an agent terminal of the multi-line user facility if a communications link is determined not to be in progress with a previous caller by the determining means;

means for routing the caller identification information of the present caller to the multi-line user facility over a data channel of the common voice-data communications line if a communications link is determined not to be in progress with a previous caller by the determining means;

means for routing the call to one of the agent terminals of the multi-line user facility over a voice channel of the common voice-data communications line if a communications link is determined not to be in progress with a previous caller by the determining means;

means for routing the call to one of the agent terminals of the multi-line user facility over a voice communications line if a communications link is determined not to be in progress with a previous caller by the determining means; and means for delaying any disconnect of the communications link on the connom voice-data line corresponding to a previous caller and a multi-line user agent terminal until completion of the transmission of the caller identification information of the present caller over the data channel if the determining means determines that a communications link is in progress over the common voice-data communications line.

30. The apparatus of claim 29 wherein the delaying means comprises:

means for sending a hold link message to the common voice-data communications line routing means after the determining means determines that a communications link is in progress over the common voice-data communications line; and means for sending a cancel hold link message to the common voice-data communications line routing means after the caller identification information has been transmitted to the multi-line user facility over the data channel, wherein the common voice-data communications line routing means delays any termination of the communications link when a hold link message is received and permits termination of the communications link upon receipt of a corresponding cancel hold link message.

31. The method of claim 28, wherein the delaying step f) comprises:

sending a hold link message to a high capacity node maintaining the communications link on the first POTS line after determining that a communications link is in progress on such line in step a); and sending a cancel hold link message to the high capacity node maintaining the communications link after the caller identification information of the present caller has been transmitted to the multi-line user facility over the second channel of the first POTS line, wherein the high capacity node maintains the communications link independent of whether voice communication over the first channel has terminated if a hold link message is received, and wherein the high capacity node permits a disconnect to occur if a corresponding cancel hold link message is received and the voice communication over the first channel has terminated.

\* \* \* \* \*